US007745984B2

(12) United States Patent
Lee et al.

(10) Patent No.: US 7,745,984 B2
(45) Date of Patent: Jun. 29, 2010

(54) COMPOSITION FOR PREPARING ELECTRON EMISSION SOURCE, METHOD FOR PREPARING ELECTRON EMISSION SOURCE USING THE COMPOSITION, AND ELECTRON EMISSION SOURCE

(75) Inventors: Hyun-Jee Lee, Suwon-si (KR); Chang-Wook Kim, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 742 days.

(21) Appl. No.: 11/251,809

(22) Filed: Oct. 18, 2005

(65) Prior Publication Data
US 2006/0082278 A1 Apr. 20, 2006

(30) Foreign Application Priority Data
Oct. 19, 2004 (KR) ............... 10-2004-0083535

(51) Int. Cl.
*H01J 1/62* (2006.01)
(52) U.S. Cl. .......... 313/497; 313/495; 430/284.1; 430/283.1; 257/10
(58) Field of Classification Search ......... 430/284.1, 430/283.1; 313/497, 309, 495; 423/445, 423/447.1; 257/10
See application file for complete search history.

(56) References Cited

U.S. PATENT DOCUMENTS 5,306,698 A * 4/1994 Ahn et al. ............... 505/475

| 5,744,282 | A | * | 4/1998 | Ichikawa et al. ........ 430/284.1 |
| 6,759,024 | B2 | * | 7/2004 | Takikawa et al. ........ 423/445 B |
| 2001/0024078 | A1 | * | 9/2001 | Dimitrijevic et al. ........ 313/311 |
| 2002/0127351 | A1 | * | 9/2002 | Takikawa et al. ........... 427/569 |
| 2002/0193040 | A1 | * | 12/2002 | Zhou .......................... 445/51 |
| 2003/0062824 | A1 | * | 4/2003 | Moon ......................... 313/495 |
| 2004/0012327 | A1 | * | 1/2004 | Shiratori et al. ............. 313/497 |
| 2004/0066132 | A1 | * | 4/2004 | Cho et al. ................... 313/495 |
| 2005/0127351 | A1 | * | 6/2005 | Tolt ............................. 257/10 |

FOREIGN PATENT DOCUMENTS

CN 1492076 4/2004

OTHER PUBLICATIONS

Lee et al., Field Emission from Well Aligned Zinc Oxide Nanowires Grown at Low Temperature, Applied Physics Letters, vol. 81, No. 19 (Nov. 4, 2002).*
Hou et al., Multi-Step Purification of Carbon Nanotubes, Carbon, vol. 40 (2002).*
Jo et al., Field Emission of Zinc Oxide Nanowires Grown on Carbon Cloth, Applied Physics Letters, vol. 85, No. 8 (Aug. 23, 2004).*
Chinese Office Action dated Mar, 6, 2009.

* cited by examiner

*Primary Examiner*—Nimeshkumar D Patel
*Assistant Examiner*—Mary Ellen Bowman
(74) *Attorney, Agent, or Firm*—H.C. Park & Associates, PLC

(57) ABSTRACT

Provided are a composition for preparing an electron emission source, including a nano-sized inorganic material and a vehicle, a method for preparing an electron emission source using the composition, an electron emission source including a nano-sized inorganic material and a small amount of a residual carbon, and further, an electron emission device including the electron emission source.

17 Claims, 2 Drawing Sheets

COMPOSITION FOR PREPARING ELECTRON EMISSION SOURCE, METHOD FOR PREPARING ELECTRON EMISSION SOURCE USING THE COMPOSITION, AND ELECTRON EMISSION SOURCE

This application claims the benefit of Korean Patent Application No. 10-2004-0083535, filed on Oct. 19, 2004, in the Korean Intellectual Property Office, the disclosure of which is incorporated herein in its entirety by reference.

BACKGROUND OF THE INVENTION

1. Field of the Invention

The present invention relates to a composition for preparing an electron emission source, a method for preparing an electron emission source using the composition and an electron emission source, and more particularly, to a composition for preparing an electron emission source, the composition including a nano-sized inorganic material and a vehicle, a method for preparing an electron emission source using the composition, an electron emission source including a nano-sized inorganic material and a small amount of a residual carbon, and is further, an electron emission device including the electron emission source.

2. Description of the Related Art

Electron emission devices are devices that emit light by applying a voltage between an anode electrode and a cathode electrode to generate an electric field such that electrons emitted from an electron emission source on the cathode electrode collide with fluorescent materials in the anode side.

Carbon-based materials, including carbon nanotubes (CNTs) having a high electron conductivity, are excellent conductors and are used to focus an electric field. Further, carbon-based materials have a low driving voltage due to a low work function and an excellent electron emission. Therefore, carbon-based materials are used in electron emission sources for electron emission devices.

A method for preparing an electron emission source including CNTs includes, for example, a method of growing CNTs using chemical vapor deposition (CVD) or a paste method using a composition for preparing an electron emission source, which includes CNTs, etc. When the paste method is used, production costs may be reduced and an electron emission source can be formed in a larger area than when the CVD method is used. The composition for preparing an electron emission source that includes CNTs, is described, for example, in U.S. Pat. No. 6,436,221.

However, conventional electron emission sources that include carbon-based materials have insufficient properties, such as current density, lifetime, etc.

SUMMARY OF THE INVENTION

The present invention provides a composition for preparing an electron emission source that can be prepared at a low cost and in a large area and have a high current density and a sufficiently long lifetime.

Additional features of the invention will be set forth in the description which follows, and in part will be apparent from the description, or may be learned by practice of the invention.

The present invention discloses a composition for preparing an electron emission source, including a nano-sized inorganic material and a vehicle.

The present invention also discloses a method for preparing an electron emission source, including providing a composition for preparing an electron emission source including a nano-sized inorganic material and a vehicle, applying the composition on a substrate, and heat-treating the composition applied on the substrate.

The present invention also discloses an electron emission source, including a nano-sized inorganic material and a residual carbon.

The present invention also discloses an electron emission device, including a first substrate and a second substrate disposed opposite to each other, a cathode electrode on the first substrate, an electron emission source coupled with the cathode electrode, an anode electrode on the second substrate, and a fluorescent layer emitting light by an electron emitted from the electron emission source, wherein the electron emission source includes a nano-sized inorganic material and a residual carbon.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Figure 1:
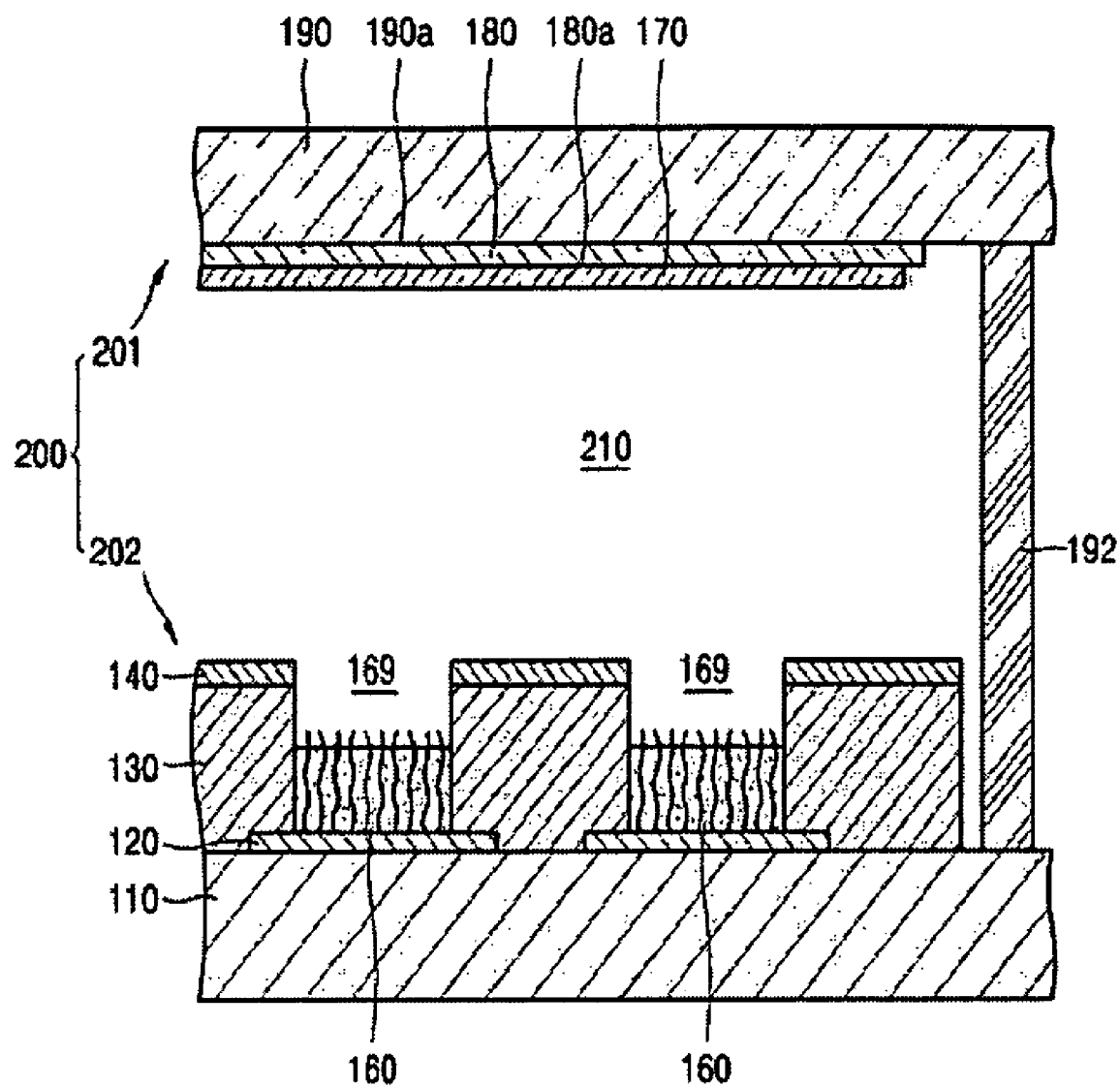
FIG. 1 is a schematic view of an electron emission device according to an embodiment of the invention.

The present invention now will be described more fully hereinafter with reference to the accompanying drawings, in which preferred embodiments of the invention are shown. The present invention may, however, be embodied in many different forms and should not be construed as limited to the embodiments set forth herein.

A composition for preparing an electron emission source according to an embodiment of the invention includes a nano-sized inorganic material and a vehicle. The term "nano-sized inorganic material" refers to a material of which a shape may be represented in a nanometer range for at least one parameter, for example, a diameter, a length, etc. and which includes an element other than carbon, such as oxygen, a transition element, etc. as an essential component thereof.

The nano-sized inorganic material may have a high aspect ratio in order to have a sufficient electron emission property. The nano-sized inorganic material may have an aspect ratio (width to height) of 10~1000, preferably 100~1000. For example, when the aspect ratio is less than 10, a sufficient electron emission property cannot be obtained. Alternatively, when the aspect ratio is greater than 1000, processibility of the nano-sized inorganic material can be reduced during the production of the electron emission source and destroyed during the operation of the electron emission source.

The nano-sized inorganic material may have various shapes. For example, the shapes may include a nanotube, a nanowire, etc. The shape of the nano-sized inorganic material varies depending on production conditions of the nano-sized inorganic material.

The nano-sized inorganic material may include, but is are not limited to, a group 4 element-containing inorganic material, such as Ti, Zr, or Hf, a group 5 element-containing inorganic material, such as V, Nb, or Ta, a group 6 element-containing inorganic material, such as Mo or W, a group 12 element-containing inorganic material, such as Zn or Cd, a group 13 element-containing inorganic material, such as B, Al, Ga, In, or Tl, a group 14 element-containing inorganic material, such as Si, Ge, or Sn, a group 15 element-containing inorganic material, such as As, Sb, or Bi, and a mixture thereof.

The nano-sized inorganic material may be a nitride, a carbide, a oxide, a sulfide, or a phosphide which includes at least one element selected from the group consisting of a group 4 element, a group 5 element, a group 6 element, a group 12 element, a group 13 element, a group 14 element, and a group 15 element. The nano-sized inorganic material may include, but is not limited to, a nanotube or a nanowire formed of $TiS_2$, $TaS_2$, $MoS_2$, $WS_2$, ZnO, ZnS, BN, GaN, InP, SiC, or $SiO_2$, etc.

The nano-sized inorganic material may be produced using various methods.

For example, a $TiS_2$ nanotube may be produced using a chemical transport reaction in which a titanium metal sponge, sulfur powders, and reagent-grade iodide are used as the starting materials. More specifically, Ti powders are mixed with S powders in an atomic ratio of Ti and S of 1:2, and then, the resultant mixture is transported in a silica ampule using iodide vapor as a transport agent for 72 hours at 750° C. and 10-2 Pa to obtain the $TiS_2$ nanotube.

For example, a $MoS_2$ nanotube may be produced using a gas-phase reaction of $MoO_3$ with $H_2S$ in the presence of argon gas. More specifically, solid $MoO_3$ is heated in a stream of a forming gas (for example, a gas mixture of 95% $N_2$ and 5% $H_2$) to partially reduce $MoO_3$, which is reacted with a stream of $H_2S$ mixed with the above forming gas. Thus, the $MoS_2$ nanotube is obtained.

For example, a ZnO nanotube may be produced as follows. A coaxial Zn/ZnO nanocable may be produced using a thermal reduction route in which ZnS powders are used as a source. The Zn/ZnO nanocable may include a metallic core made with Zn and a semiconductive outer shell made with ZnO. When the Zn/ZnO nanocable is annealed, the Zn core is evaporated and the ZnO nanotube remains.

For example, a GaN nanotube may be produced using a CVD system in which a hexagonal ZnO nanowire is used as a template. In the CVD method, a thin film of GaN may be formed and the ZnO nanowire as a template may be removed by thermal reduction and evaporation so that the GaN nanotube remains. A GaN having an internal diameter of approximately 30-200 nm and a wall thickness of approximately 5-50 nm may be produced using this method.

For example, a SiC nanowire may be produced as follows. A solution of iron chloride hydrate in a polar solvent is coated on a silicon substrate. The coated substrate is then placed into a reaction furnace and a quartz boat including Ga and gallium nitride is provided near the coated substrate. The reaction furnace is then heated to approximately 1000~1200° C. and methane gas and hydrogen gas are injected into the reaction furnace. The reaction furnace is is then cooled to approximately room temperature. Nanoparticles formed on the substrate by coating the solution of iron chloride hydrate in the polar solvent to the silicon substrate function as a catalyst for synthesizing the SiC nanowire.

In a method of producing a ZnO wire, which is one of the nano-sized inorganic materials according to an embodiment of the invention, conventional organic metal CVD and a conventional apparatus for forming a thin film are used. A Zn-containing organic metal and an oxygen-containing gas or an oxygen-containing organic material are used as reactants. An inert gas, such as argon, etc. is used as a transport gas. The gases of the reactants are respectively separately injected into a reactor, e.g., through separate lines, and precursors of the reactants are reacted in the reactor in order to deposit and form a ZnO wire on a substrate. The pressure in the reactor is maintained at approximately 760 torr or less and the temperature is maintained at approximately 200~1000° C.

The Zn-containing organic material may be formed with Dimethyl zinc, zinc acetate, anhydrous zinc acetate, zinc acetylacetonate, etc. The oxygen-containing gas may be formed with $O_2$, $O_3$, $NO_2$, water vapor, $CO_2$, etc. The oxygen-containing organic material may be formed with $C_4H_8O$, etc.

The vehicle used in the composition according to an embodiment of the invention controls printability and viscosity of the composition. The vehicle may include a resin component and a solvent component. The resin component may include at least one selected from the group consisting of cellulose-based resin (such as ethyl cellulose and nitro cellulose, etc.), acryl-based resin (such as polyester acrylate, epoxy acrylate, and urethane acrylate, etc.), and vinyl-based resin(such as polyvinyl acetate, polyvinyl butyral, and polyvinyl ether, etc.). The above-mentioned resin components may also function as a photosensitive resin.

The solvent component may include at least one selected from a group consisting of terpineol, butyl carbitol (BC), butyl carbitol acetate (BCA), toluene, and texanol. According to an embodiment of the invention, the solvent component includes terpineol.

The amount of the resin component may be approximately 100~500 parts by weight, preferably approximately 200~300 parts by weight, based on 100 parts by weight of the nano-sized inorganic material. The amount of the solvent component may be approximately 500~1500 parts by weight, preferably 800~1200 parts by weight, based on 100 parts by weight of the nano-sized inorganic material. If the amounts of the resin component and the solvent component are not in the above ranges, Printability and flowability properties of the present composition deteriorate when the amounts of the resin component and the solvent component are not in the above ranges. For example, when the amounts of the resin component and the solvent component are more than the upper limits, drying time of the composition may be overextended.

The composition according to an embodiment of the present invention may further include an adhesive component, a photosensitive resin and a photoinitiator, and a filler, if necessary.

The amount of the resin component may be approximately 100~500 parts by weight, preferably approximately 200~300 parts by weight, based on 100 parts by weight of the nano-sized inorganic material. The amount of the solvent component may be approximately 500~1500 parts by weight, preferably 800~1200 parts by weight, based on 100 parts by weight of the nano-sized inorganic material. If the amounts of the resin component and the solvent component are not in the above ranges, printability and flowability properties of the present composition deteriorate when the amounts of the resin component and the solvent component are not in the above ranges. For example, when the amounts of the resin component and the solvent component are more than the upper limits, drying time of the composition may be overextended.

The amount of the inorganic binder in the composition may be approximately 10~50 parts by weight, preferably approximately 15~35 parts by weight, based on 100 parts by weight of the nano-sized inorganic material. When the amount of the inorganic binder is less than approximately 10 parts by weight, based on 100 parts by weight of the nano-sized inorganic material, a sufficient adhesive force cannot be attained. When the amount of the inorganic binder is greater than 50 parts by weight, based on 100 parts by weight of the nano-sized inorganic material, printability may be reduced.

The photosensitive resin may be used for patterning the electron emission source. The photosensitive resin may include an acrylate-based monomer, a benzophenone-based monomer, an acetophenone-based monomer, a thioxanthone-based monomer, etc. More specifically, epoxy acrylate, polyester acrylate, 2,4-diethyloxanthone, or 2,2-dimethoxy-2-phenylacetophenone, etc. may be used as the photosensitive resin. The amount of the photosensitive resin is approximately 300~1000 parts by weight, preferably approximately 500~800 parts by weight, based on 100 parts by weight of the nano-sized inorganic material. When the amount of the photosensitive resin is less than approximately 300 parts by weight, based on 100 parts by weight of the nano-sized inorganic material, sensitivity to light exposure is reduced. When the amount of the photosensitive resin is more than approximately 1000 parts by weight, based on 100 parts by weight of the nano-sized inorganic material, sufficient development cannot be attained.

The photoinitiator initiates cross-linking of the photosensitive resin when the photosensitive resin is exposed to light. The photoinitiator includes, but is not limited to, benzophenone, etc. The amount of the photosensitive resin may be approximately 300~1000 parts by weight, preferably approximately 500~800 parts by weight, based on 100 parts by weight of the nano-sized inorganic material. When the amount of the photoinitiator is less than approximately 300 parts by weight, based on 100 parts by weight of the nano-sized inorganic material, the cross-linking does not occur efficiently, and thus, the patterning may not be facilitated. When the amount of the photoinitiator is greater than approximately 1000 parts by weight, based on 100 parts by weight of the nano-sized inorganic material, the production costs may be increased.

The filler may be used to increase the conductivity of the nano-sized inorganic material that is not fully attached with the substrate. The filler may include, but is limited to, Ag, Al, and Pd, etc.

The composition for preparing an electron emission source according to an embodiment of the invention may have a viscosity of approximately 3,000~50,000 cps, preferably approximately 5,000~30,000 cps.

A method for preparing an electron emission source according to an embodiment of the invention uses the composition for preparing the electron emission source, as described above. More specifically, the method includes providing the composition for preparing an electron emission source, applying the composition on a substrate, and heat-treating the composition printed on the substrate.

The composition for preparing an electron emission source is produced using the above-described components and amounts. Detailed descriptions regarding the composition are presented above, and thus will not be repeated for purposes of convenience.

The composition is then printed on the substrate. The term "substrate" refers to a substrate on which the electron emission source will be formed and may vary depending on the type of the electron emission device to be manufactured, which is easily recognized by those of ordinary skill in the art. For example, in an electron emission device having a gate electrode between a cathode and an anode, "the substrate" refers to the cathode and in an electron emission device having a gate electrode formed below a cathode, "the substrate" refers to an insulating layer which insulates between the cathode and the gate electrode.

The applying of the composition depends on whether the composition includes the photosensitive resin. When the composition includes the photosensitive resin, a separate photoresist pattern is not required. For example, the composition including the photosensitive resin is coated on the substrate, and then, the coated substrate is exposed and developed according to a pattern of a region in which the electron emission source will be formed.

When the composition does not include the photosensitive resin, a photolithographic process using a separate photoresist pattern is required. For example, the photoresist pattern is formed using a photoresist layer, and then, the composition is printed through the photoresist pattern.

The printed composition is then heat-treated. Due to the heat-treatment, the adhesive force between the nano-sized inorganic material in the composition and the substrate may be increased, at least a portion of the vehicle may be volatized from the composition, and other components such as the inorganic binder, etc. may be melted and solidified to improve durability of the electron emission source.

The heat-treating temperature may be selected considering the temperature and time of volatizing the vehicle that is included in the composition. A conventional heat-treating temperature is approximately 400~500° C., and preferably approximately 450° C. When the heat-treating temperature is less than approximately 400° C., the vehicle, etc. cannot be fully volatized from the composition. When the heat-treating temperature is greater than approximately 500° C., the production costs may be increased and the substrate may be damaged.

The heat-treating may be performed in the presence of oxygen gas, inert gas, or a mixture thereof. The inert gas may be, for example, nitrogen gas, argon gas, neon gas, xenon gas, and a mixture thereof.

The conventional composition for preparing an electron emission source, which includes carbon-based materials, is generally heat-treated in the presence of inert gas without having oxygen gas to minimize deterioration of the carbon-based materials. Such heat-treating in the inert gas atmosphere may generate a residual carbon in the electron emission source.

Since the composition for preparing an electron emission source according to an embodiment of the present invention includes the nano-sized inorganic material, rather than the carbon-based materials that may deteriorate due to contact with oxygen and a high temperature, the composition may be heat-treated in the presence of oxygen gas. Due to this heat-treating, the amount of the residual carbon may be reduced and the adhesive force between the nano-sized inorganic material and the substrate may increase, while the nano-sized inorganic material rarely deteriorates.

The nano-sized inorganic material at a surface of the heat-treated product may be optionally activated. For example, the activation may be performed by coating a solution that can be cured in a form of film using thermal treatment, for example, a surface treating agent for an electron emission source, which comprises polyimide-based polymer, on the heat-treated product, thermally treating the resultant product, and then peeling off the formed film.

Alternatively, the activation may be performed by forming an adhesive element on a surface of a roller that is driven or operated using a predetermined driving source and pressing a surface of the heat-treated product using the roller at a predetermined pressure. Due to this activation, the nano-sized inorganic material may be controlled to be exposed at the surface of the electron emission source or to be vertically positioned on the substrate.

According to an embodiment of the invention, the electron emission source includes a nano-sized inorganic material and a residual carbon.

The term "residual carbon" refers to a solid material remaining after a carbon-containing organic compound is thermally treated. The compositional components of the residual carbon may vary widely depending on the components of the organic compound.

The term "residual carbon" which is contained in the electron emission source refers to a solid material remaining after the organic compounds, except the nano-sized inorganic material, among the various compositional components in the composition for preparing the electron emission source are thermally treated. Thus, residual carbon refers to a solid material remaining after the exposure products from the vehicle and the optional components, for example, the light-exposure resultant of the photosensitive resin and the photoinitiator, etc. are thermally treated.

The amount of the residual carbon in the electron emission source may be approximately 20~300 parts by weight, preferably 100 parts by weight or less, based on 100 parts by weight of the nano-sized inorganic material. The amount of a residual carbon in the conventional electron emission source that is prepared using the carbon-based materials containing composition is approximately 50~500 parts by weight based on 100 parts by weight of the carbon-based materials. Therefore, the amount of the residual carbon in the electron emission source of the present invention is significantly reduced compared to the amount of residual carbon in the conventional electron emission source.

Such a reduction of the amount of the residual carbon results because the composition for preparing an electron emission source may be heat-treated in the presence of oxygen gas, as described in the above heat-treating process. When the heat-treating is conducted in the presence of the oxygen gas, a thermal decomposition of the carbon-containing organic compounds in the composition may be more efficiently effected, which reduces the residual carbon in the electron emission can be reduced. Further, the nano-sized inorganic material, which is more resistant to oxygen and a high temperature than the carbon-based materials, does not deteriorate or minimally deteriorates during the heat-treating.

According to an embodiment of the invention, the electron emission source has a current density of approximately 400~1100 µA/cm², preferably, 600~1100 µA/cm², as determined at 5 V/µm. The conventional electron emission source which is prepared using the carbon-based materials containing composition generally has a current density of approximately 450 µA/cm², as determined at 5 V/µm. Therefore, the current density of the electron emission source of the present invention is significantly increased compared to the current density of the conventional electron emission source.

The current density increases because the electron emission source of the present invention includes a small amount of residual carbon; therefore, the adverse effects of inhibiting electron emission performance and vertical alignment of the nano-sized inorganic material by the residual carbon is reduced. The electron emission source having the increased current density of the present invention may be used in an electron emission device that is used as a backlight unit or a display device.

FIG. 1 is a schematic view illustrating an electron emission device according to an embodiment of the invention, the electron emission device having a triode structure. Referring to FIG. 1, an electron emission device 200 has a top structure 201 and a bottom structure 202. The top structure 201 may include a top substrate 190, an anode electrode 180 disposed on the bottom surface 190a of the top substrate 190, and a fluorescent layer 170 disposed on the bottom surface 180a of the anode electrode 180.

The bottom structure 202 may include a bottom substrate 110 disposed substantially parallel and opposite to the top substrate 190 and separated from the top substrate 190 by a predetermined distance to form a light-emitting space 210, a cathode electrode 120 disposed in a form of stripes on the bottom substrate 110, a gate electrode 140 disposed in a form of stripes and crossed with the cathode electrode 120, an insulating layer 130 interposed between the gate electrode 140 and the cathode electrode 120, electron emission source holes 169 formed through the insulating layer 130 and the gate electrode 140, and electron emission sources 160 disposed in the holes 169 to be coupled, e.g., electrically connected, with the cathode electrode 120 and lower than the gate electrode 140. Detailed descriptions regarding the electron emission sources 160 are presented above, and are not repeated for purposes of convenience.

The space between the top structure 201 and the bottom structure 202 is maintained in vacuum. A spacer 192 may be disposed between the top structure 201 and the bottom structure 202 such that the spacer 192 may resist a pressure applied between the top structure 201 and the bottom structure 202 due to the vacuum and divide the light-emitting space 210.

A high voltage is applied to the anode electrode 180 to accelerate electrons emitted from the electron emission sources 160 so that they collide with the fluorescent layer 170 at high speed and excite phosphor to emit visible light.

The gate electrode 140 enables the electrons to be easily emitted from the electron emission sources 160. The insulating layer 130 divides the electron emission source holes 169 and provides insulation between the electron emission sources 160 and the gate electrode 140.

It is understood that electron emission devices having other structures, including a diode structure are within the scope of the present invention. The present invention may be applied in electron emission devices in which a gate electrode is disposed below a cathode electrode and electron emission devices having a grid/mesh structure to prevent damage of a gate electrode and/or a cathode by are that might be generated by a discharge phenomenon and to focus electrons emitted from an electron emission source. The electron emission device may also be also applied to a display device.

Hereinafter, the present invention is described with reference to the following examples. It is understood that these examples are provided for illustration purposes and are not intended to limit the scope of the invention.

EXAMPLES

Preparation Example 1

To 10 g of terpineol, 1 g of ZnO nanotube powders, 0.2 g of frit (8000L, manufactured by Shinheung Ceramic Ind. Co., Ltd.), 5 g of polyester acrylate, and 5 g of benzophenone were added and stirred to obtain a composition for preparing an electron emission source, which has a viscosity of 30,000 cps. The obtained composition is referred to as Composition 1.

Preparation Example 2

A composition for preparing an electron emission source was prepared in the same manner as in Preparation Example 1, except that GaN nanotube powders were used instead of ZnO nanotube powders. The obtained composition is referred to as Composition 2.

Comparative Preparation Example 1

A composition for preparing an electron emission source was prepared in the same manner as in Preparation Example 1, except that CNT powders (MWNT, manufactured by Iljin Nanotech Co., Ltd.) were used instead of ZnO nanotube powders. The obtained composition is referred to as Composition A.

Estimation Example 1

Two 1 g samples of Composition 1 were prepared. The two samples were heat-treated in an atmosphere of nitrogen at 450° C. and in an atmosphere of air at 450° C., respectively, and then their weights were measured and the amounts of resultant of the heat-treatment were calculated. The same process was repeated for Composition A. The results are shown in Table 1.

TABLE 1

|  | Heat-treating in nitrogen | Heat-treating in air |
| --- | --- | --- |
| Composition A | 0.0420% | 0.0196% |
| Composition 1 | 0.0288% | 0.0150% |

As shown in Table 1, for Composition A, 0.0420% of heat-treated product was produced from the heat-treating in the nitrogen atmosphere and 0.0196% of heat-treated product was produced from the heat-treating in the air atmosphere, while for Composition 1, 0.0288% of heat-treated product was produced from the heat-treating in the nitrogen atmosphere and 0.0150% of heat-treated product was produced from the heat-treating in the air atmosphere. Therefore, when Composition 1 according to an embodiment of the invention is heat-treated, the amount of a residual carbon may be reduced in the air atmosphere.

Example 1

Composition 1 was coated on a substrate having a Cr gate electrode, an insulating layer, and an ITO electrode and exposed to an energy of 2000 mJ/cm$^2$ irradiated from a parallel exposure machine through a pattern mask. The product was then developed using acetone and heat-treated in the presence of a mixed gas of oxygen and nitrogen at 450° C. to form an electron emission source. A substrate having a fluorescent layer and an ITO anode electrode was then disposed opposite to the above substrate and a spacer was disposed between both the substrates, the spacer maintaining a cell gap between the substrates. The obtained electron emission device is referred to as Sample 1.

Example 2

An electron emission device was prepared using the same manner as in Example 1, except that Composition 2 was used instead of Composition 1. Hereinafter, the obtained electron emission device is referred to as Sample 2.

Comparative Example

An electron emission device was prepared using the same manner as in Example 1, except that Composition A was used in place of Composition 1 and the heat-treating was performed in the presence of nitrogen, instead of a mixed gas of oxygen and nitrogen. The obtained electron emission device is referred to as Sample A.

Evaluation Example 2

Figure 2:
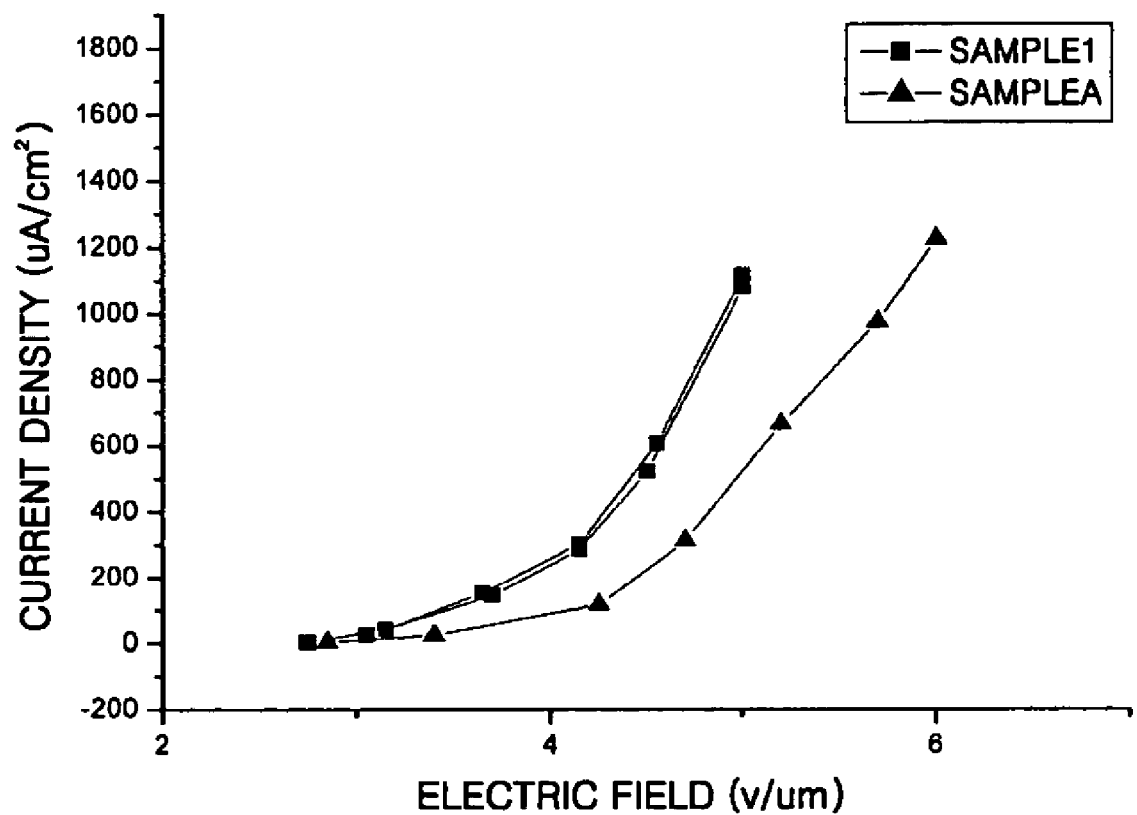
FIG. 2 is a graph showing current densities of an electron emission device according to an embodiment of the invention and a conventional electron emission device.

Current densities of Samples 1 and A were measured using a pulse power source and an ammeter. The results are shown in FIG. 2. Referring to FIG. 2, Sample 1 had a current density of 1100 μA/cm$^2$, as determined at 5 V/μm, while Sample A had a current density of 450 μA/cm$^2$, as determined at 5 V/μm. As shown, Sample 1 had a higher electron emission property than that of Sample A.

According to the present invention, the electron emission source which includes a small amount of residual carbon and has a high current density may be prepared using the composition that includes the nano-sized inorganic material. Further, the electron emission device may be manufactured using the above electron emission source.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A composition for preparing an electron emission source, the composition comprising:
   a vehicle; and
   inorganic nanotubes or inorganic nanowires dispersed in the vehicle,
   wherein the inorganic nanotubes or the inorganic nanowires comprise a nitride, a carbide, a oxide, a sulfide, or a phosphide including at least one element selected from the group consisting of a group 4 element, a group 5 element, a group 6 element, a group 12 element, Ga, In and Si,
   wherein the composition, when heated, provides a residual carbon being 20 to 300 parts by weight, based on 100 parts by weight of the inorganic nanotubes or inorganic nanowires.

2. The composition of claim 1, wherein the inorganic nanotubes or inorganic nanowires have an aspect ratio of approximately 10~1000.

3. The composition of claim 1, wherein the inorganic nanotubes or inorganic nanowires comprises at least one inorganic material selected from a group consisting of TiS$_2$, TaS$_2$, MoS$_2$, WS$_2$, ZnO, ZnS, GaN, InP, SiC, and SiO$_2$.

4. The composition of claim 1, wherein the vehicle comprises at least one resin component selected from a group consisting of cellulose-based resin, acryl-based resin, and vinyl-based resin and at least one solvent component selected from the group consisting of terpineol, butyl carbitol, butyl carbitol acetate, toluene, and texanol.

5. The composition of claim 1, further comprising at least one selected from a group consisting of an adhesive component, a photosensitive resin and a photoinitiator, and a filler.

6. A method for preparing an electron emission source, comprising:
   applying a composition on a substrate, the composition comprising inorganic nanotubes or inorganic nanowires dispersed in a vehicle; and
   heat-treating the composition applied on the substrate, the heat-treating yielding residual carbon being 20 to 300 parts by weight, based on 100 parts by weight of the inorganic nanotubes or inorganic nanowires,
   wherein the inorganic nanotubes or the inorganic nanowires comprise a nitride, a carbide, a oxide, a sulfide, or a phosphide including at least one element selected from the group consisting of a group 4 element, a group 5 element, a group 6 element, a group 12 element, Ga, In and Si.

7. The method of claim 6, wherein the applying the composition comprises:
   coating the composition on the substrate and exposing and developing the composition at a predetermined region,
   wherein the composition further comprises a photosensitive resin and a photoinitiator.

8. The method of claim 6, wherein the heat-treating is performed in the presence of oxygen gas, inert gas, or a mixture thereof.

9. The method of claim 6, wherein the heat-treating is performed at approximately 400~500° C.

10. An electron emission source, comprising:
    inorganic nanotubes or inorganic nanowires; and
    a residual carbon,
    wherein the residual carbon is 20 to 300 parts by weight, based on 100 parts by weight of the inorganic nanotubes or inorganic nanowires, and
    wherein the inorganic nanotubes or the inorganic nanowires comprise a nitride, a carbide, a oxide, a sulfide, or a phosphide including at least one element selected from the group consisting of a group 4 element, a group 5 element, a group 6 element, a group 12 element, Ga, In and Si.

11. The electron emission source of claim 10, wherein the electron emission source has a current density of approximately 400~1100 $\mu A/cm^2$, as determined at 5 V/$\mu$m.

12. An electron emission device, comprising:
    a first substrate and a second substrate disposed opposite to each other;
    a cathode electrode on the first substrate;
    an electron emission source coupled with the cathode electrode;
    an anode electrode on the second substrate; and
    a fluorescent layer emitting light by an electron emitted from the electron emission source,
    wherein the electron emission source comprises inorganic nanotubes or inorganic nanowires and a residual carbon,
    wherein the residual carbon is 20 to 300 parts by weight, based on 100 parts by weight of the inorganic nanotubes or inorganic nanowires, and
    wherein the inorganic nanotubes or the inorganic nanowires comprise a nitride, a carbide, a oxide, a sulfide, or a phosphide including at least one element selected from the group consisting of a group 4 element, a group 5 element, a group 6 element, a group 12 element, Ga, In and Si.

13. The electron emission device of claim 12, wherein the electron emission source has a current density of 400~1100 $\mu A/cm^2$, as determined at 5 V/$\mu$m.

14. The composition of claim 1, wherein the viscosity of the composition is 3,000 to 50,000 cps.

15. An electron emission source, comprising:
    inorganic nanotubes or inorganic nanowires; and
    a residual carbon,
    wherein the residual carbon is a solid material remaining after heat treatment of an exposure product of a vehicle comprising organic compounds, and
    wherein the inorganic nanotubes or the inorganic nanowires comprise a nitride, a carbide, a oxide, a sulfide, or a phosphide including at least one element selected from the group consisting of a group 4 element, a group 5 element, a group 6 element, a group 12 element, Ga, In and Si.

16. An electron emission device, comprising:
    a first substrate and a second substrate disposed opposite to each other;
    a cathode electrode on the first substrate;
    an electron emission source coupled with the cathode electrode;
    an anode electrode on the second substrate; and
    a fluorescent layer emitting light by an electron emitted from the electron emission source,
    wherein the electron emission source comprises inorganic nanotubes or inorganic nanowires, and a residual carbon, the residual carbon being a solid material remaining after heat treatment of an exposure product of a vehicle comprising organic compounds, and wherein the inorganic nanotubes or the inorganic nanowires comprise a nitride, a carbide, a oxide, a sulfide, or a phosphide including at least one element selected from the group consisting of a group 4 element, a group 5 element, a group 6 element, a group 12 element, Ga, In and Si.

17. A composition for preparing an electron emission source, the composition comprising:
    a vehicle; and
    inorganic nanotubes or inorganic nanowires dispersed in the vehicle,
    wherein the composition, when heated, provides a residual carbon being 20 to 300 parts by weight, based on 100 parts by weight of the inorganic nanotubes or inorganic nanowires.

* * * * *